United States Patent Office 2,915,555
Patented Dec. 1, 1959

2,915,555

PREPARATION OF CRYSTALLINE OXYTETRACYCLINE SALTS

Isaiah A. Solomons III, New London, Conn., assignor to Chas. Pfizer & Co., Inc., Brooklyn, N.Y., a corporation of Delaware No Drawing. Application July 17, 1958
Serial No. 749,072

5 Claims. (Cl. 260—559)

This invention relates to the preparation of crystalline acid addition salts of oxytetracycline and particularly crystalline hydrohalide salts thereof. This application is a continuation-in-part of my copending application, Serial No. 535,296 filed September 19, 1955, which in turn is a continuation-in-part of Serial No. 194,388 filed November 6, 1950, both of which are now abandoned.

Oxytetracycline is an amphoteric stable organic compound which forms both metal and acid addition salts and which is highly active against a variety of pathogenic microorganisms. It is produced by strains of *Streptomyces rimosus* when grown in suitable bacteriological media, and may be recovered from the fermentation broths by a variety of methods, yielding products of varying purity. Oxytetracycline has been shown to have the following structure:

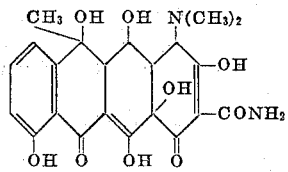

The preparation and characteristics of oxytetracycline have been disclosed in U.S. Patent 2,516,080, issued July 18, 1950. It is of great advantage to prepare the antibiotic in pure, crystalline form, since many undesirable impurities are thus eliminated, and the product has enhanced stability. The pure, crystalline forms, in addition, permit the dispensing of exact dosages of the drug uncontaminated by various impurities.

Oxytetracycline has certain properties that tend to make it difficult to crystallize pure acid salts thereof, especially halogen acid salts. Thus, if purified oxytetracycline is dissolved in water by the addition of hydrochloric acid until a pH of about 2 is reached, and the solution is concentrated by evaporation at reduced pressure, the free antibiotic rather than its hydrochloride tends to crystallize out of the solution. If the same aqueous solution is dried from the frozen state, and the resulting powder is dissolved in water, the free antibiotic again tends to form by hydrolysis.

As pointed out in the above abandoned application, amphoteric oxytetracycline is only slightly soluble in most alcohols. When the term amphoteric oxytetracycline is used what is meant is the uncombined antibiotic as opposed to the metal and acid addition salts thereof. Thus the use of an alcoholic solution of the amphoteric antibiotic for the production of the hydrogen halide salts suffers from certain distinct practical difficulties. For example, large volumes of solvents are required with concomitant low recoveries of the desired salt. To illustrate, the solubility of amphoteric oxytetracycline in a number of alkanols at 25° C. is listed: methanol, 0.020 g./ml.; ethanol, 0.012 g./ml.; and butanol, 0.00019 g./ml.

The great discovery disclosed in this and my earlier applications is that certain materials when present in relatively small amounts in alcoholic solution have the property of solubilizing the amphoteric oxytetracycline. Among the valuable solubilizing agents of the process of this invention that were disclosed are various metal salts in particular the lower alkanol soluble halides of zinc, the alkali metals, and the alkaline earth metals. It has since been found that some other salts such as certain of the nitrates, sulfates, and perchlorates of the above metals also have this solubilizing ability. In general, however, the halides are preferred since uniformly good results are achieved throughout the series. The terms alkali metal and alkaline earth metal in their common usage mean the elements of groups IA and IIA in the periodic classification of the elements. Some of the more common of these metals are lithium, sodium, potassium, calcium and magnesium. By alcohol soluble halides in this series is meant the fluorides, chlorides, bromides, and iodides which are soluble in the particular alcoholic solvent selected to the extent of at least about 0.02 g./ml. at the temperature employed. Thus solubilizing agent-solvent combinations that are not applicable due to the insolubility of the metal salt include magnesium chloride in ethanol, sodium chloride in methanol, ethanol, or n-propanol, sodium bromide in n-propanol, and barium chloride in methanol or ethanol. Useful combinations include calcium chloride in methanol, calcium bromide in methanol or ethanol, strontium chloride in methanol, magnesium chloride in methanol, sodium bromide in methanol, zinc chloride in methanol, lithium chloride in methanol, etc.

A further surprising feature of this invention as originally disclosed is that the hydrogen halides in low concentration also serve to solubilize the amphoteric oxytetracycline. When an amount of oxytetracycline corresponding up to about 0.2–0.3 g./ml. of solvent is present this solubilizing effect is observed in the concentration range 0.01–0.05 g./ml. of the hydrogen halide. In the absence of the present solubilizing agents, from 10 to 1000 fold or more the amount of solvent specified is required to dissolve the antibiotic. At the higher concentrations of hydrogen halide, the hydrogen halide salt of the antibiotic commences to precipitate. Particularly useful hydrogen halides are anhydrous hydrogen chloride, concentrated hydrochloric acid, concentrated hydrobromic acid, etc. Thus, oxytetracycline hydrochloride, for example, can be readily prepared by means of a two stage treatment in alcohol with hydrochloric acid. First the amphoteric antibiotic is solubilized by treatment with hydrochloric acid in the concentration range given above, insoluble impurities, if any, are removed, and the oxytetracycline hydrochloride is then precipitated by treatment with a further quantity of hydrochloric acid.

According to another embodiment of this novel process, the oxytetracycline is dissolved in an alcohol which contains a metal halide, such as one of the alkali or alkaline earth metal halides mentioned above. The exact nature of the soluble form of the oxytetracycline in such a system or in systems containing a hydrogen halide as the solubilizing agent is not known. For some reason, the presence of the solubilizing agent allows the dissolution of high concentrations of the antibiotic, while many of the various impurities normally present when oxytetracycline is recovered from fermentation broths remain insoluble and are easily removed by filtration or other conventional means. Furthermore, adsorbing agents such as activated carbons may readily remove many impurities which do dissolve in the alcoholic medium.

A feature of this invention which has proven very useful in practical application, involves supplying the amphoteric oxytetracycline in situ by treating a suspension of crude oxytetracycline hydrochloride in a lower aliphatic alcohol with an organic amine. The amphoteric antibiotic is thus liberated and the amine hydrochloride is formed. Substantially any organic amine may be employed for this purpose so long as it is soluble in the solvent selected and is a stronger base than oxytetracycline. It is useful to select an amine whose hydrochloride is soluble in the solvent selected. Separation of the oxytetracycline hydrohalide from the amine hydrohalide is thus facilitated. Useful amines include pyridine, piperidine, triethylamine, trimethylamine, ethanolamine, etc. By this means a process is provided for upgrading low quality oxytetracycline acid addition salts obtained during recovery and purification of the antibiotic. When the term amphoteric oxytetracycline is used here it is intended to apply to this material whether supplied in that form or produced in situ as described. The process is thus adapted to the formation of pure oxytetracycline hydrochloride from crude amphoteric material recovered from a fermentation broth, or other source such as contaminated or damaged intermediates or finished goods.

In precipitating the crystalline acid addition salt after the oxytetracycline has been dissolved in the alcoholic solution of one of the above types, it is preferred that the halide precipitating agent be of the same type, i.e. containing the same anion, as is present in the solubilizing agent. Thus, if oxytetracycline be dissolved in an alcoholic solution of calcium chloride or hydrochloric acid, then the precipitant should be some form of hydrogen chloride; if the alcoholic solution contains hydrobromic acid or sodium bromide, then hydrogen bromide should be added to effect the crystallization. It may be necessary to vary the amount of precipitating agent used, depending upon the purity of the oxytetracycline under treatment, the character of the alcoholic solution and its metal or hydrogen halide content, and similar interdependent factors. Such variations may be readily determined by those skilled in the art, using as guides the time required for precipitation, the desirability of seeding, etc. It is generally preferred to operate with a concentration of 0.3 g./ml. of oxytetracycline in the alcohol solution and as indicated above with a content of metal halide therein of between about 0.02 and about 0.3 g./ml. When hydrogen halide is used in place of the metal halide, its preferred range of concentration is substantially from 0.01 g./ml. to 0.05 g./ml. Under such conditions, satisfactory precipitation is usually achieved by adding to the oxytetracycline solution a quantity of hydrogen halide equal to 0.02 to 0.06 g./ml. The required amount of these reagents will vary somewhat with the purity of the oxytetracycline used, the optimum amount being readily determined. Another factor which may vary considerably without materially affecting the present process, is the potency of the oxytetracycline starting material; for commercially most useful products, however, an initial oxytetracycline potency of at least about 500 mcg./mg. is preferable.

Further factors which must be considered in carrying out this valuable process are the temperature and the time. It is generally preferred to operate below 30° C. up to the point where the precipitated product is chilled and collected. The time factor is important primarily at the acidification stage of the process, that is at the point where the product is precipitated by treatment of the solution with the precipitating hydrogen halide. This operation is usually completed in less than about 4 hours. However, longer times have been employed. Frequent assays are a useful guide if the mixture is kept longer than about four hours at this stage. This is also the point at which temperature control is critical. It is preferred to operate below about 20° C. at this stage, that is during the acidification, and then to cool the mixture further before collecting the product. Higher temperatures, that is higher than about 30° C., and prolonged standing at this stage result in a loss in potency due to degradation of the antibiotic resulting from contact with the strongly acid solution.

Essentially any alcohol may be used in the present process, provided that it normally occurs as a liquid and is capable, with the aforesaid additions, of dissolving a substantial proportion of oxytetracycline and solubilizing agent. It is preferable to use the lower, saturated aliphatic alcohols, such as methanol, ethanol, mixtures thereof and the like.

As pointed out above, this process is applicable to the preparation of each of the oxytetracycline hydrohalide salts, that is oxytetracycline hydrofluoride, hydrochloride, hydrobromide and hydroiodide. However, for physiological applications such as oral or parenteral administration of the oxytetracycline hydrohalide to a human or animal for its therapeutic or nutritional effect, it is preferred to use the hydrochloride salt. In preparing this salt solubilization is effected by means of either hydrogen chloride or a metal chloride as outlined above and the hydrochloride salt of the antibiotic is precipitated by treatment of the solution with hydrogen chloride. The other hydrohalide salts are less desirable in the common therapeutic applications. Hydrogen fluoride is highly toxic and destructive of animal tissue and the solubilizing agents such as calcium fluoride employed in the preparation of oxytetracycline hydrofluoride are very toxic substances and thus present a manufacturing hazard. While the administration of iodides and bromides is useful in some types of therapy, their presence is not ordinarily considered desirable in antimicrobial therapy with an antibiotic such as oxytetracycline. Therefore, these two hydrogen halide salts are similarly less suited than the hydrochloride for ordinary usage.

The following examples are given to illustrate this invention and are not intended in any way to limit its scope.

*Example I*

Twenty grams of crude crystalline oxytetracycline assaying 832 mcg./mg. were suspended in 100 ml. of methanol. Addition of 10 ml. of methanol saturated with calcium chloride caused the antibiotic to dissolve. The solution was filtered and 20 ml. of concentrated hydrochloric acid were slowly added. Seeds of crystalline oxytetracycline hydrochloride were introduced, crystallization of the product started immediately, and the mixture was allowed to stand without agitation for three hours. The precipitated yellow crystals were then recovered by filtration and washed first with methanol containing a small amount of hydrochloric acid and then with pure methanol. The product was dried at 56° C. under vacuum. It weighed 19.9 g. and assayed 800 mcg./mg.

*Example II*

A sample of crude crystalline oxytetracycline was suspended in a small volume of methanol and a saturated solution of calcium bromide in methanol was added. The antibiotic readily dissolved and, upon addition of strong aqueous hydrobromic acid solution, crystalline oxytetracycline hydrobromide separated.

*Example III*

When the procedure of Example II was repeated using a methanolic solution of strontium chloride rather than calcium bromide, the oxytetracycline readily dissolved and, after addition of concentrated hydrochloric acid, crystalline oxytetracycline hydrochloride was recovered.

*Example IV*

The substitution of a methanolic solution of magnesium chloride, for the solution of calcium bromide used in Example II, brought about the same result. Addition of concentrated hydrochloric acid to the clear solution again resulted in the formation of crystalline oxytetracycline hydrochloride.

*Example V*

Crude crystalline oxytetracycline assaying about 900 mcg./mg. was suspended in methanol, and a solution of sodium bromide in methanol was added. The clear solution was treated with strong aqueous hydrobromic acid, causing the crystallization of oxytetracycline hydrobromide.

*Example VI*

Crystalline oxytetracycline was dissolved by the addition of zinc chloride to a methanolic suspension of the antibiotic. The slow addition of concentrated hydrochloric acid caused the separation of oxytetracycline hydrochloride crystals.

*Example VII*

Oxytetracycline was suspended in a small volume of methanol and a solution of lithium chloride in methanol was added. A clear solution was obtained, and crystalline oxytetracycline hydrochloride separated therefrom upon the addition of concentrated hydrochloric acid.

*Example VIII*

Fifty grams of crude oxytetracycline (assaying 740 mcg./mg.) were suspended in 220 ml. of methanol. The suspension was stirred and 16.8 ml. of concentrated hydrochloric acid were added to dissolve the antibiotic. The solution was filtered, and the clear filtrate was treated with an additional 16.8 ml. of the acid. Crystalline oxytetracycline hydrochloride began to precipitate and, after stirring the suspension slowly for two hours, the crystals were filtered. They were washed with a mixture of 8.8 volumes of methanol and 1.2 volumes of concentrated hydrochloric acid and then with pure methanol. The product was dried under vacuum, and the dried material was found to weigh 38 g. and have a bioactivity of 859 mcg./mg. A yield of 85% was thus obtained, and the product was practically free of ash.

Instead of the hydrochloric acid in methanol, a solution of anhydrous hydrogen chloride in ethanol was used in the same manner and gave similar results.

*Example IX*

One hundred grams of crude crystalline oxytetracycline hydrochloride was suspended in 340 ml. of methanol containing 38 ml. of triethylamine. The amphoteric oxytetracycline thereby produced was then brought into solution by treatment with 126 ml. of saturated methanolic calcium chloride solution. The solution which contained a small amount of insoluble material was then treated with decolorizing carbon and filtered. Pure oxytetracycline hydrochloride was precipitated by treatment of the clear filtrate with 63 ml. of concentrated aqueous hydrochloride acid.

As many apparently widely different embodiments of this invention may be made without departing from the spirit and scope thereof, it is to be understood that the above invention is not limited except as defined in the appended claims.

What is claimed is:

1. A process for preparing an oxytetracycline hydrohalide salt which comprises dissolving up to about 0.3 g./ml. of amphoteric oxytetracycline, recovered from a fermentation broth and containing lower alkanol insoluble impurities, in a lower alkanol in the presence of a lower alkanol soluble solubilizing agent selected from the group consisting of 0.01 to 0.05 g./ml. of an anhydrous hydrogen halide, 0.01 to 0.05 g./ml. of concentrated hydrohalic acid, 0.02 to 0.3 g./ml. of a lower alkanol soluble alkali metal halide, 0.02 to 0.3 g./ml. of a lower alkanol soluble alkaline earth metal halide, and 0.02 to 0.3 g./ml. of a lower alkanol soluble zinc halide, separating precipitated impurities and subsequently treating said solution with 0.02 to 0.06 g./ml of a hydrogen halide thereby precipitating said oxytetracycline hydrohalide salt.

2. A process for preparing an oxytetracycline hydrohalide salt which comprises dissolving up to about 0.3 g./ml. of amphoteric oxytetracycline, in a lower alkanol in the presence of a lower alkanol soluble solubilizing agent selected from the group consisting of 0.01 to 0.05 g./ml. of an anhydrous hydrogen halide, 0.01 to 0.05 g./ml. of concentrated hydrohalic acid, 0.02 to 0.3 g./ml. of a lower alkanol soluble alkali metal halide, 0.02 to 0.3 g./ml. of a lower alkanol soluble alkaline earth metal halide and 0.02 to 0.3 g./ml. of a lower alkanol soluble zinc halide and subsequently treating said solution with 0.02 to 0.06 g./ml. of a hydrogen halide thereby precipitating said oxytetracycline hydrohalide salt.

3. A process as claimed in claim 2 wherein the solubilizing agent is calcium chloride.

4. A process as claimed in claim 2 wherein the solubilizing agent is magnesium chloride.

5. A process as claimed in claim 2 wherein the solubilizing agent is zinc chloride.

References Cited in the file of this patent

UNITED STATES PATENTS 2,516,080    Sobin _____ July 18, 1950

OTHER REFERENCES

Regna et al.: Ann. N.Y. Acad. Sci., vol. 54, p. 234, Sept. 15, 1950.